(12) United States Patent
Everson

(10) Patent No.: US 8,753,036 B1
(45) Date of Patent: Jun. 17, 2014

(54) UNDERGROUND WATER RETENTION SYSTEM AND ASSOCIATED METHODS

(76) Inventor: Douglas G. Everson, Tavares, FL (US)

( * ) Notice: Subject to any disclaimer, the term of this patent is extended or adjusted under 35 U.S.C. 154(b) by 0 days.

(21) Appl. No.: 13/584,067

(22) Filed: Aug. 13, 2012

Related U.S. Application Data

(63) Continuation of application No. 12/545,291, filed on Aug. 21, 2009, now Pat. No. 8,240,950, which is a continuation-in-part of application No. 12/147,722, filed on Jun. 27, 2008, now Pat. No. 7,632,408.

(60) Provisional application No. 60/947,060, filed on Jun. 29, 2007.

(51) Int. Cl.
*E02B 11/00* (2006.01)
(52) U.S. Cl.
USPC .......................... 405/51; 405/38; 210/170.08
(58) Field of Classification Search
USPC ......... 405/36, 38, 43, 49, 51, 52; 210/170.01, 210/170.03, 170.08
See application file for complete search history.

(56) References Cited

U.S. PATENT DOCUMENTS

| | | | | |
|---|---|---|---|---|
| 3,060,693 | A * | 10/1962 | Taylor | 405/43 |
| 5,516,229 | A * | 5/1996 | Atchley et al. | 405/36 |
| 5,520,481 | A * | 5/1996 | Atchley et al. | 405/43 |
| 6,702,517 | B2 * | 3/2004 | Goddard | 405/45 |
| 7,632,408 | B1 | 12/2009 | Everson | |
| 7,661,903 | B1 | 2/2010 | Maroschak et al. | |
| 7,857,545 | B2 * | 12/2010 | Burcham | 405/36 |
| 8,240,950 | B1 | 8/2012 | Everson | |

* cited by examiner

*Primary Examiner* — Tara M. Pinnock
(74) *Attorney, Agent, or Firm* — Allen, Dyer et al.

(57) ABSTRACT

A liquid retention system in accordance with an embodiment of the invention comprises a plurality of pipes having a wall defining a pipe conduit, at least some of the pipes having at least one hole through the wall for allowing liquid to enter the conduit. Each of two sets of pipe groups is arranged into a two layers of the pipes. The pipes in one layer are arranged in adjacent proximity along their lengths such that the walls of adjacent pipes define a plurality of gaps while the pipes in the second layer are at least partially seated in the gaps. The cylindrical axes of the pipes in the two pipe groups relative to one another are non-parallel. The pipe groups are arranged in a liquid retention portion, which is at least partially enclosed to retain liquid therein.

9 Claims, 5 Drawing Sheets

UNDERGROUND WATER RETENTION SYSTEM AND ASSOCIATED METHODS

CROSS-REFERENCE TO RELATED APPLICATION

This is a continuation of application Ser. No. 12/545,291 filed Aug. 21, 2009, entitled "Underground Water Retention System and Associated Methods," which is a continuation-in-part of application Ser. No. 12/147,722, filed Jun. 27, 2008, which claims the benefit of provisional application Ser. No. 60/947,060, filed Jun. 29, 2007. Each of these references is incorporated herein by reference in its entirety.

FIELD OF THE INVENTION

The present invention relates to a water retention system for use in an underground installation and associated methods.

BACKGROUND OF THE INVENTION

Water retention is essential for any number of varied applications. Whether there is excess rain or storm water that needs to be dealt with or water shortages, water regulation is necessary to preserve people's health, safety, and property. Commercially, there are also potentially limitless applications for a system capable of capturing and storing water for later use. Agriculturally, a constant supply of fresh water is crucial for farms, including, but not limited to, for use with livestock and crops. Hospitals or emergency shelters also must have clean water constantly available, especially in emergency situations. Fire stations and car washes also would greatly benefit from being able to recapture the mass quantities of water that are expended on a daily basis for re-use. Homeowners also could use such water for a variety of purposes, including, but in no means limited to, irrigation.

Heretofore, those who have desired to capture and store water have used costly or unsightly systems that occupy valuable land area and are not able to store significant amounts of water. An example of these systems is found in U.S. Pat. No. 7,025,879 to Ticknor and U.S. Pat. No. 7,395,633 to Baeta, both of which teach above-ground systems designed to store water from the roof of a house in a barrel shaped device, and U.S. Pat. No. 5,730,179 to Taylor, which discloses another method of storing a relatively minor amount of rainwater from the roof of a home in a cylindrical device on the side of the home. These systems all suffer from the disadvantages of occupying aboveground space on a piece of property and having the capacity to only store a relatively small amount of water.

SUMMARY OF THE INVENTION

One object of the present invention is to receive water from any water source or collection device and store it in a unique underground pipe system that, in alternative embodiments, can also transport and/or distribute excess water into the ground. This system has an endless variety of potential residential and commercial applications, especially as, being stored underground, the water stored therein would not evaporate and could be stored indefinitely with little risk of contamination that can occur in stagnant water store above the ground.

Also, since one object of the present system is to reclaim water that has previously been fertilized or treated, the system can substantially reduce future costs by capturing that fertilized or treated water and allowing it to be re-used. The system can also be used to capture and collect storm water runoff from agricultural applications, allowing treatment before discharge. For this type of use, filtration medias or materials can also be added to the present invention to clean the sediment or remove pollutants.

The present invention accomplishes all of this without necessarily taking up valuable land space or being comprised of unsightly structures. The present invention also offers the alternative advantage of being able to be constructed using little or no rock and being able to operate completely passively, as some of its embodiments do not require any moving parts or electricity to operate, and therefore economically. Therefore, this invention can be constructed and operated more efficiently and economically.

The water retention system disclosed herein allows for water to be stored underground for a variable length of time and used as needed, and alternatively also provides a method to transport and distribute the water. According to an embodiment of the stated invention, the system comprises at least one layer of at least one cylindrical void pipe with at least one hole therein. Preferably, these pipes are corrugated, four inches in diameter and ten feet long, such as those illustrated in U.S. Pat. Nos. 5,516,229 ('229) and 5,520,481 ('481), the disclosures of which are herein incorporated by reference, and the pipes are bundled together, with, for instance, plastic netting. The corrugation is beneficial to trap soluble substances and filter the water contained within the pipes. These pipes are underground, and are covered on all sides, save for means to fluidly connecting the pipes to a water source, by an impermeable cover. This cover could be an impermeable sheet, such as polyethylene, rubber, or polyvinyl chloride, but could also be a plastic box. The pipes are in fluid communication with a water source, such as, by way of example, a roof gutter, an above or below ground pipe or container, or even the ground itself. The pipes can be arranged in virtually any shape, but preferably is square or rectangular with a top, bottom, two sides and two ends.

The holes in the void pipes allow water collection from the ground or movement of water between the layers of pipes. Alternatively, the layers of pipe have a distribution pipe positioned to distribute the water throughout the layers, such as in the manner specified in the '229 and '481 patents. The holes also allow the system to separate and filter soluble substances.

Optionally, the top layer of pipes is not covered by an impermeable barrier, but instead is open to the ground itself or is covered by a water permeable barrier. Both of these embodiments allows the layers to receive water directly from the ground as well as allow access to the layers and any water stored therein.

As one skilled in the art would recognize, there are a variety of alternative embodiments for the present invention. For example, the layers optionally contain a means for filtration or purification of the water within the pipes. This is helpful in agricultural applications, as well as if landowner desires to reuse the water. If reuse of the water is intended, the system also has a means for accessing, and/or transporting water from the layers to the surface.

In yet another embodiment of the present invention, the layers spans a desired length and has at least one means to allow access to the layers from the surface, or for transporting water from the layers to the surface. One example of a use of this embodiment is to provide readily accessible water to fire fighters. This embodiment also comprises a feeder line hooked to a pump to allow the water to be pumped from the length of the layers.

The system alternatively comprises a means for distributing the water in the ground that is in fluid connection with the layers. Preferably, the means for distribution is comprised of a series of void pipes with a one or holes therein such as those disclosed in the above-referenced '229 and '481 patents.

In one embodiment of the means for distribution, the means for connection is a substantially vertical and cylindrical pipe with means to fluidly connect the layers and the means for distribution. The means to fluidly connect the pipe to the layers and the means for distribution can comprise a second pipe to connect the layers to the pipe, and a third pipe to connect the pipe to the means for distribution. The second and third pipes preferably would be substantially cylindrical and horizontal. These pipes are varying sizes and shapes to accommodate and produce the desired amount of water retention and flow.

In practice, in this embodiment of the invention, water preferably flows into the means for distribution only after a specific amount accumulates in the layers. This allows both a consistent amount of water to remain in the layers and provides time to allow the means for distribution to distribute the water into the ground.

Preferably, there is additionally a means to regulate the amount of water that is allowed from the layers into the means for distribution, such as a water control device that is adjusted by the user. These means for regulation are located between the layers and the means for connection, between the means for connection and the means for distribution, or alternatively is located within or comprise the means for connection as well. One skilled in the art would recognize that various means could accomplish this result, such as a ball valve, pump or lever.

One preferred embodiment of the regulation means comprises a substantially cylindrical and vertical pipe connector with means to fluidly connect it to the layers and the means for distribution. This connector has upper, middle and lower portions. The middle portion of this pipe is divided across the diameter by a divider, thereby creating first and second halves. This divider is preferably comprised of at least one substantially vertically stacked insert, such as boards, but one skilled in the art will appreciate that it can be comprised of any water impermeable material, such as plastic. The first portion of the middle portion of the connector comprises means to fluidly connect it to the layers, such as at least one hole, and has a water impermeable bottom separating it from the lower portion. In practice, in order for water from the layers to be able to flow into the second portion to be distributed, water would have to fill the layers enough to be able to flow into and fill the first portion and flow over the divider and into the upper portion and then fall into the second portion. The second portion is in fluid communication with the lower portion, which in turn has means to fluidly connect it to the means for distribution. This mechanism provides the benefit of a passive means for water regulation between the layers and means for distribution.

Depending on anticipated and desired water retention and distribution, the connector pipe has a larger or smaller circumference to be able to accommodate more or less water, and the material comprising the divider is adjustable in height to require more or less water to build-up in the first portion in order for the water to flow into the second portion and ultimately the means for distribution.

One preferred material is stackable boards, such that simply adding or removing one or more of the boards regulates water flow. In times of heavy water flow, all of the boards are removed such that as soon as the water enters the layers it flows directly into the means for distribution. Alternatively, should the user desire to store water, additional boards are added such that more water is required to fill the first portion and be allowed into the means for distribution.

It is important to note that the system described herein requires no electricity or moving parts to function, and is designed to store and distribute water strictly on the amount of water that flows into it without requiring any other type of regulation or intervention.

This invention's parent application, U.S. patent application Ser. No. 12/147,722 ("722 Application"), discloses a passive drain field assembly for use in a septic tank application that is comprised of similar components. The '722 Application discloses a system comprised of a first chamber containing a multi-pipe bundle for receiving, and to some extent storing, effluent, and a second chamber which is comprised of, among other elements, a means for distributing effluent into the soil therebeneath. The '722 Application further teaches the use of an impermeable liner to create a retention area, albeit for effluent rather than water as in the present invention, in the second chamber of that system.

The invention will be more fully understood by review of the below-referenced drawings that are solely for illustrative purposes.

DETAILED DESCRIPTION OF AN EMBODIMENT

A description of embodiments of the present invention will be detailed herein with reference to FIGS. 1-5. The features that characterize the invention, both as to organization and method of operation, together with further objects and advantages thereof, will be better understood from the foregoing description considered in conjunction with the accompanying drawings. It should be noted that the drawings are for the purpose of illustration and description and are not intended as a definition of the limits of the invention. These and other objects attained, and advantages offered, by the present invention will become more fully apparent as the description that now follows is read in conjunction with the accompanying drawings.

Figure 1:
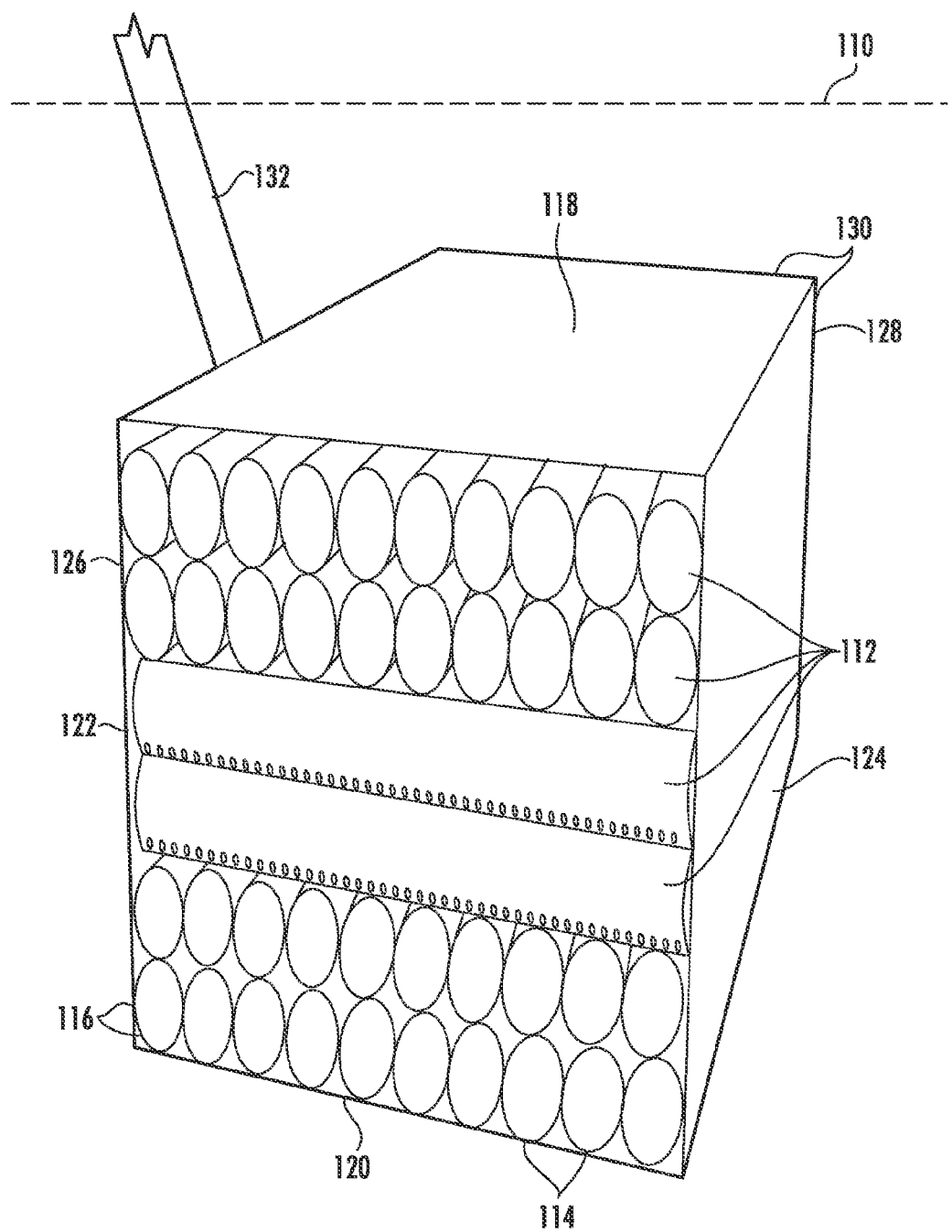
FIG. 1 is a cross-sectional view of a water retention system according to an embodiment of the present invention.
Figure 2:
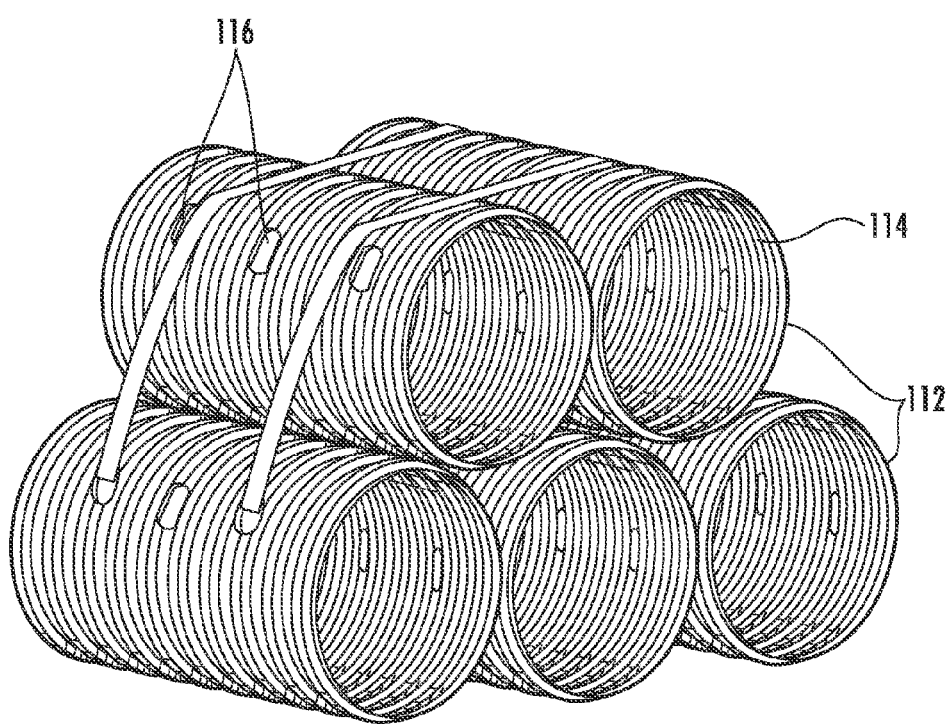
FIG. 2 is a side-view of the pipes of the present invention.
Figure 3:
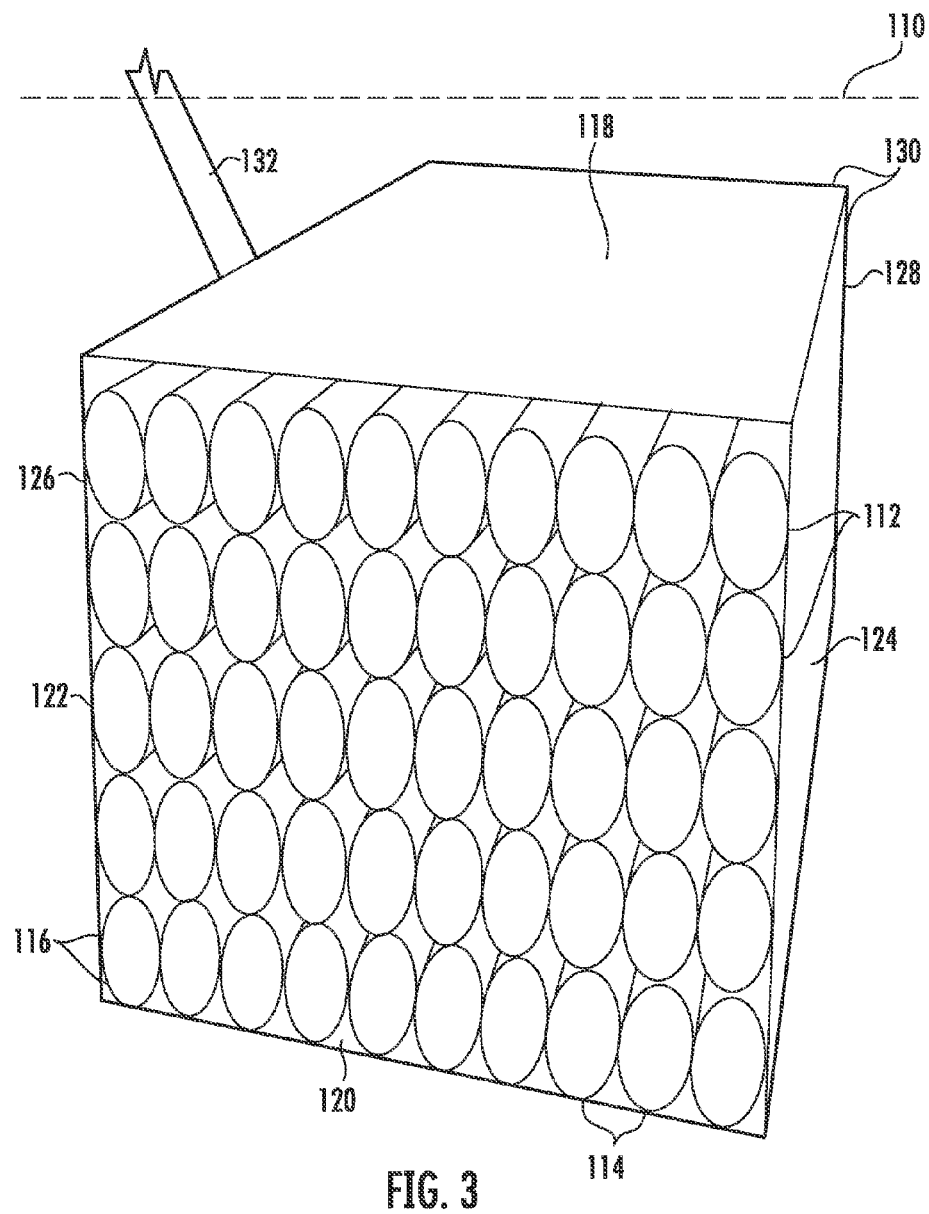
FIG. 3 is a side-view of the embodiment of FIG. 1 with a means for transporting the water from the layers to the surface.

Referring to FIGS. 1 and 2, according to an embodiment of the underground water retention system of the present invention, the system comprises an installation beneath the ground 110 at least one layer 112 of substantially cylindrical pipes 114 with at least one hole therein 116 such as those described in the '229 and '481 patents. The layers 112 preferably have a top 118, bottom 120, two sides 122, 124 and two ends 126, 128 and are enclosed by a water impermeable barrier 130 except for the means to transport 132 the water to the layers from a water source (not shown). The water source could be, for example, a roof gutter or water collection container (not shown). Preferably, the layers are crisscrossed for stability such every two layers run at a ninety-degree (90°) angle from the two layers immediately surrounding the two layers. Referring to FIG. 3, according to an alternative embodiment of FIG. 1, the layers of pipe are parallel.

Figure 4:
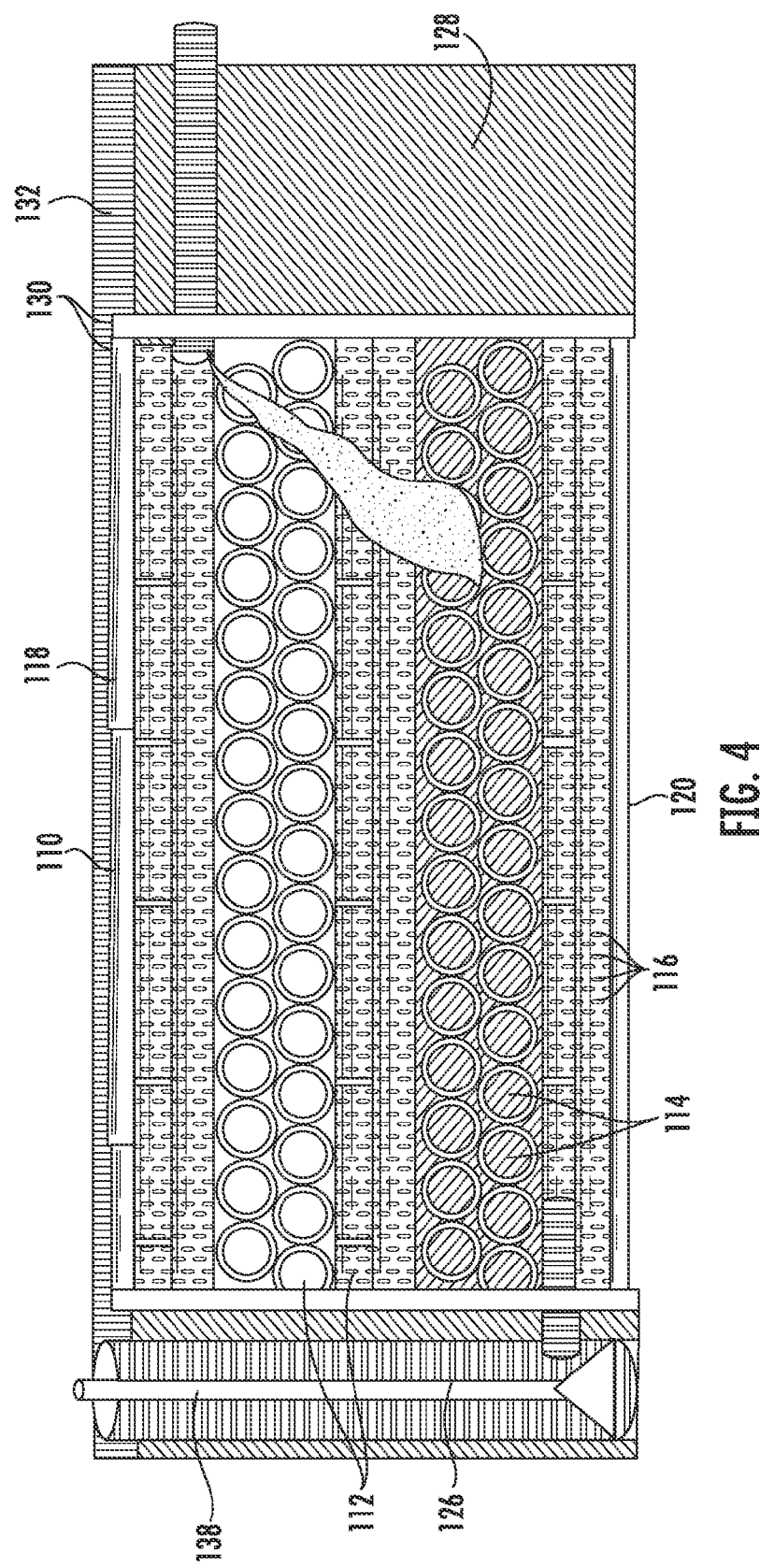
FIG. 4 is a cross-sectional view of the embodiment of FIG. 1 with parallel layers of pipes.

With reference to FIG. 4, an alternative embodiment of the system further comprises a means for transporting 138 the water from the layers to the surface for use, such as by a pump.

Figure 5:
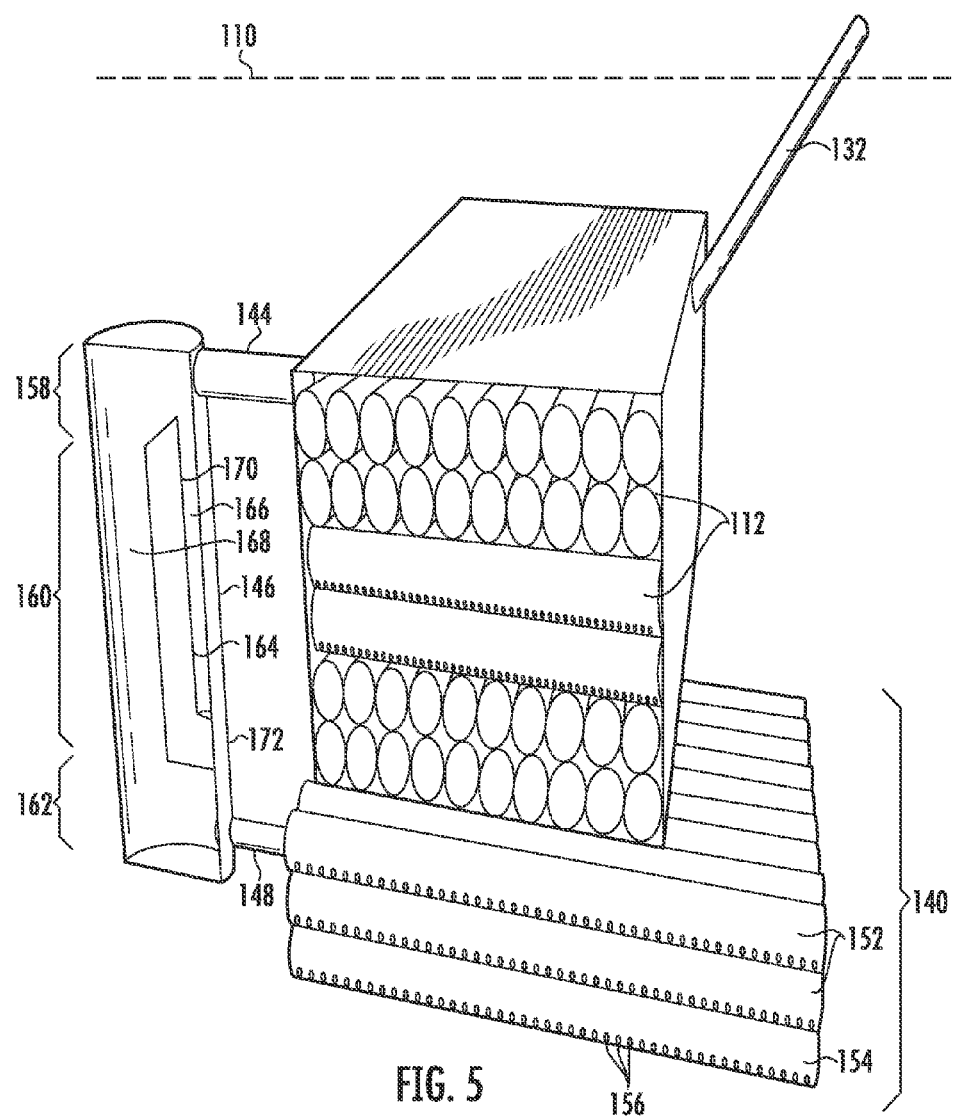
FIG. 5 is a cross-sectional view of an embodiment of the water retention and distribution invention disclosed herein, with crisscrossed layers of pipe, the connector containing a means for water regulation between the layers and the means for distribution and a means to transport the water from the layers to the surface.

Referring to FIG. 5, an alternative embodiment of FIG. 1, further comprising a means for distribution 140 and a means for connecting the layers 112 to the means for distribution 144, 146, 148. In this embodiment, the means for connection comprises a substantially vertical and cylindrical pipe 146 connecting the layers 112 to the means for distribution 140 via a first and second pipe 144, 148. The means for distribution 140 is alternatively comprised of at least one layer 152 of at least one substantially horizontal and cylindrical pipe 154 with at least one hole therein 156 such as those disclosed in the above-referenced '229 and '481 patents.

The preferred embodiment of the means for regulating 150 the amount of water that flows from the layers 112 into the means for distribution 140 show in FIG. 5 is located within the substantially vertical and substantially cylindrical pipe 146. This connector has upper 158, middle 160 and lower 162 portions. The middle portion 160 is divided across the diameter by a divider 164, thereby creating first and second portions 166, 168. This divider 164 is comprised of at least one substantially vertically stacked insert 170. The first portion 166 is fluidly connected to the layers 112 via a substantially horizontal and substantially cylindrical pipe 144, and has a water impermeable bottom 172 separating it from the lower portion 162. The second portion 168 is in fluid communication with the lower portion 162, which in turn is fluidly connected to the means for distribution 140 via the second pipe 148.

Referring to FIG. 6, FIG. 5 is an embodiment of the invention where the top layer is not enclosed by a water impermeable covering 174 and the source of water is the ground 110.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system illustrated and described herein are by way of example, and the scope of the invention is not limited to the exact details of construction and use.

Having now described the invention, the construction, the operation and use of preferred embodiments thereof and the advantageous new and useful results obtained thereby, the new and useful constructions, and reasonable equivalents thereof obvious to those skilled in the art, are set forth in the appended claims.

What is claimed is:

1. A liquid retention system comprising:
a plurality of pipes, each pipe having a wall defining a pipe conduit, at least some of the pipes having at least one hole through the wall for allowing liquid to enter the conduit;
a first pipe group comprising a first layer of the pipes and a second layer of the pipes, the pipes in the first layer being arranged in adjacent proximity along their lengths such that the walls of adjacent pipes define a plurality of gaps, the pipes in the second layer being at least partially seated in the gaps; and
a second pipe group comprising a third layer of pipes and a fourth layer of pipes, the pipes in the third layer being arranged in adjacent proximity along their lengths such that the walls of adjacent pipes define a plurality of gaps, the pipes in the fourth layer being at least partially seated in the gaps; wherein:
the first and second pipe groups are arranged in a liquid retention portion, the liquid retention portion being at least partially enclosed to retain liquid therein; and
the cylindrical axes of the pipes in the first pipe group relative to the cylindrical axes of the pipes in the second pipe group are non-parallel.

2. The liquid retention system of claim 1, further comprising a liquid flow pathway between the liquid retention portion and a liquid receiving portion in liquid flow communication with the liquid retention portion with a liquid flow barrier positioned along the liquid flow pathway, the liquid flow barrier being capable of preventing liquid from entering the liquid receiving portion unless the liquid level in the liquid retention portion rises above a height of the liquid flow barrier.

3. The liquid retention system of claim 2, wherein the height of the barrier is adjustable to retain a predetermined amount of liquid in the liquid retention portion.

4. The liquid retention system of claim 1, further comprising a liquid receiving portion in liquid flow communication with the liquid retention portion and arranged to receive an overflow amount of liquid from the liquid retention portion, the liquid receiving portion comprising a plurality of the generally cylindrical pipes.

5. The liquid retention system of claim 4, wherein the generally cylindrical pipes in the liquid receiving portion comprise a fifth layer of pipes and a sixth layer of pipes, the pipes in the fifth layer being arranged in adjacent proximity along their lengths such that the walls of adjacent pipes define a plurality of gaps, the pipes in the sixth layer being at least partially seated in the gaps.

6. The liquid retention system of claim 4, wherein the first and second pipe groups further comprise a plurality of pipe assemblies, the pipe assemblies comprising at least one strap transversely encompassing a plurality of pipes from different layers and securing the encompassed pipes together.

7. The liquid retention system of claim 4, further comprising a liquid flow pathway between the liquid retention portion and a liquid receiving portion in liquid flow communication with the liquid retention portion with a liquid flow barrier positioned along the liquid flow pathway, the liquid flow barrier being capable of preventing liquid from entering the liquid receiving portion unless the liquid level in the liquid retention portion rises above a height of the liquid flow barrier.

8. The liquid retention system of claim 7, wherein a height of the liquid flow barrier is adjustable to retain a predetermined amount of liquid in the liquid retention portion.

9. The liquid retention system of claim 1, wherein the first and second pipe groups further comprise a plurality of pipe assemblies, the pipe assemblies comprising at least one strap transversely encompassing a plurality of pipes from different layers and securing the encompassed pipes together.

* * * * *